(12) United States Patent
Wang et al.

(10) Patent No.: US 12,356,324 B2
(45) Date of Patent: Jul. 8, 2025

(54) METHOD AND APPARATUS FOR POWER SAVINGS IN A WIRELESS LOCAL AREA NETWORK

(71) Applicant: InterDigital Patent Holdings, Inc., Wilmington, DE (US)

(72) Inventors: Xiaofei Wang, Cedar Grove, NJ (US); Monisha Ghosh, Chicago, IL (US); Lei Wang, San Diego, CA (US); Nirav B. Shah, San Diego, CA (US); Guodong Zhang, Woodbury, NY (US); Sudheer A. Grandhi, Pleasanton, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/149,215

(22) Filed: Oct. 2, 2018

(65) Prior Publication Data

US 2019/0037489 A1    Jan. 31, 2019

Related U.S. Application Data

(63) Continuation of application No. 13/785,445, filed on Mar. 5, 2013, now Pat. No. 10,123,266.
(Continued)

(51) Int. Cl.
*H04W 52/02*     (2009.01)

(52) U.S. Cl.
CPC ... *H04W 52/0203* (2013.01); *H04W 52/0206* (2013.01); *H04W 52/0219* (2013.01); *Y02D 30/70* (2020.08)

(58) Field of Classification Search
CPC .............................. H04W 52/02; H04W 84/12
See application file for complete search history.

(56) References Cited

U.S. PATENT DOCUMENTS 8,024,001 B2   9/2011   Iacono et al.
8,526,346 B1 *   9/2013   Liu .................. H04W 52/0229
                                                     370/311
(Continued)

FOREIGN PATENT DOCUMENTS

CN    101296481 A    10/2008
CN    101584229      11/2009
(Continued)

OTHER PUBLICATIONS

Grandhi et al., "Considerations for early NAV indication," IEEE 802.11-12/0615r0 (May 11, 2012).
(Continued)

*Primary Examiner* — Zhiren Qin
(74) *Attorney, Agent, or Firm* — Volpe Koenig

(57) ABSTRACT

A method and apparatus for power savings in a wireless local area network (WLAN) are disclosed. A station (STA) may receive parameters that associate the STA to a specific group of STAs and perform a channel access during a period that is allowed for the group of STAs based on the parameters. The STA may receive information regarding an access slot that is allowed for the group of STAs and access a channel during the access slot. The STA may receive a schedule for wake up from a doze state and goes in and out of the doze state based on the schedule. A highest channel access priority may be provided to a sensor or meter type of STA. The STA may indicate to an access point (AP) that the STA will not listen to a traffic indication map (TIM) or a delivery TIM (DTIM) in a beacon.

17 Claims, 12 Drawing Sheets

Related U.S. Application Data

(60) Provisional application No. 61/607,481, filed on Mar. 6, 2012, provisional application No. 61/642,231, filed on May 3, 2012, provisional application No. 61/645,957, filed on May 11, 2012, provisional application No. 61/669,492, filed on Jul. 9, 2012, provisional application No. 61/696,568, filed on Sep. 4, 2012.

(56) References Cited

U.S. PATENT DOCUMENTS

| | | | |
|---|---|---|---|
| 2005/0124345 A1 | 6/2005 | Laraia et al. | |
| 2005/0152324 A1 | 7/2005 | Benveniste | |
| 2006/0034224 A1 | 2/2006 | Nakamata et al. | |
| 2006/0087984 A1 | 4/2006 | Kim et al. | |
| 2006/0240799 A1* | 10/2006 | Kim | H04B 1/1615 455/343.2 |
| 2006/0252443 A1 | 11/2006 | Sammour et al. | |
| 2007/0072638 A1 | 3/2007 | Yang et al. | |
| 2007/0097867 A1* | 5/2007 | Kneckt | H04W 72/20 370/329 |
| 2007/0201467 A1 | 8/2007 | Kakani | |
| 2008/0220769 A1 | 9/2008 | Qi et al. | |
| 2008/0313230 A1 | 12/2008 | Karaoguz et al. | |
| 2009/0161587 A1 | 6/2009 | Ishii et al. | |
| 2009/0232042 A1 | 9/2009 | Kneckt et al. | |
| 2009/0296619 A1 | 12/2009 | Sammour et al. | |
| 2010/0008277 A1* | 1/2010 | Kopikare | H04W 52/0206 370/311 |
| 2010/0165896 A1* | 7/2010 | Gong | H04W 52/0216 370/311 |
| 2010/0254290 A1* | 10/2010 | Gong | H04W 52/0261 370/311 |
| 2010/0297979 A1 | 11/2010 | Watfa et al. | |
| 2011/0038291 A1 | 2/2011 | Seok | |
| 2011/0045763 A1 | 2/2011 | Mohanty et al. | |
| 2011/0069689 A1 | 3/2011 | Grandhi et al. | |
| 2011/0149820 A1* | 6/2011 | Lee | H04W 52/0235 370/311 |
| 2011/0199952 A1* | 8/2011 | Seok | H04W 52/02 370/311 |
| 2011/0261739 A1 | 10/2011 | Fong et al. | |
| 2012/0030358 A1* | 2/2012 | MacKenzie | H04W 52/0229 709/226 |
| 2012/0044925 A1 | 2/2012 | Lee et al. | |
| 2012/0087287 A1* | 4/2012 | Kim | H04W 52/0216 455/522 |
| 2012/0327914 A1 | 12/2012 | Kang et al. | |
| 2013/0070642 A1 | 3/2013 | Kim et al. | |
| 2013/0070658 A1 | 3/2013 | Noh et al. | |
| 2013/0128867 A1 | 5/2013 | Calcev et al. | |

FOREIGN PATENT DOCUMENTS

| | | |
|---|---|---|
| CN | 101637050 | 1/2010 |
| CN | 101971675 | 2/2011 |
| JP | 2007-537655 | 12/2007 |
| JP | 2008-523697 | 7/2008 |
| JP | 2009-219156 | 9/2009 |
| KR | 10-0927525 | 11/2009 |
| KR | 2011-0097564 | 8/2011 |
| RU | 2421924 | 6/2011 |
| WO | 2005/112355 | 11/2005 |
| WO | 2006/062292 | 6/2006 |
| WO | 2008/115282 | 9/2008 |
| WO | 2011/149285 | 1/2011 |
| WO | 2011/028490 | 3/2011 |
| WO | 2011/149271 | 12/2011 |

OTHER PUBLICATIONS

Grandhi et al., "Considerations for PSMP Enhancements," IEEE 802.11-12/0407r0 (Mar. 13, 2012).
Abraham et al., "Short Beacon," IEEE 802.11-11/1503r2, pp. 1-11 (Nov. 2011).
Calcev et al., "Non-TIM Stations in 11ah", IEEE 11-12-0610-00-00-Ah, May 2012, 12 pages.
Cheong, "TGah Functional Requirements and Evaluation Methodology Rev. 5," IEEE 802.11-09/0905r5, pp. 1-20 (Jan. 19, 2012).
Chu et al., "Low Collision EDCA," IEEE 802.11-11/0116r0, pp. 1-8 (Jan. 16, 2012).
Chu et al., "TGah Power Saving," IEEE 802.11-12/0102r2, pp. 1-9 (Jan. 16, 2012).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.4 (Nov. 2011).
Gong et al., "11ah Channelization of China," IEEE 802.11-11/1320r0, pp. 1-5 (Sep. 2011).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std 802.11-REVmb/D12 (Nov. 2011).
Kaiying et al., "MAC Header Design for Small Data Packet for 802.11ah," IEEE 802.11-12/0094r2, pp. 1-11 (Jan. 2012).
Liu et al., "DCF Enhancements for Large Number of STAs," IEEE 802.11-11/1255r0, pp. 1-11 (Sep. 2011).
Liu et al., "Early Ack Indication," IEEE 802.11-12/0119r0, pp. 1-7 (Jan. 16, 2012).
Pantelidou et al., "Power Saving Possibilities for Networks Supporting a Large number of STAs," IEEE 802.11-12/0028r1, pp. 1-14 (Jan. 2012).
Park et al., "TGah TIM Operation," IEEE 802.11-12/0117r0, pp. 1-10 (Jan. 2012).
Park, "Proposed Specification Framework for TGah," IEEE 802.11-11/1137r6, pp. 1-12 (Mar. 2012).
Park, "Station Group Management for 802.11 ah," IEEE 802.11-11/0762r0, pp. 1-9 (May 2011).
Wentink et al., "Low Power Medium Access," IEEE 802.11-12/0114r0, pp. 1-13 (Jan. 2012).
Zhang et al., "Power Saving Mechanism Consideration for 802.11ah Framework", IEEE 11-11/1204r1, Sep. 18, 2011, 10 pages.
Zhang et al., "Consideration on Max Idle Period Extension for 802.11ah Power Save," IEEE 11-12/69r2, pp. 1-14 (Jan. 19, 2012).
Zhou et al., "Extension of AID and TIM to Support 6000 STAs in 802.11ah," IEEE 802.11-11/1550r1, pp. 1-9 (Nov. 2011).

\* cited by examiner

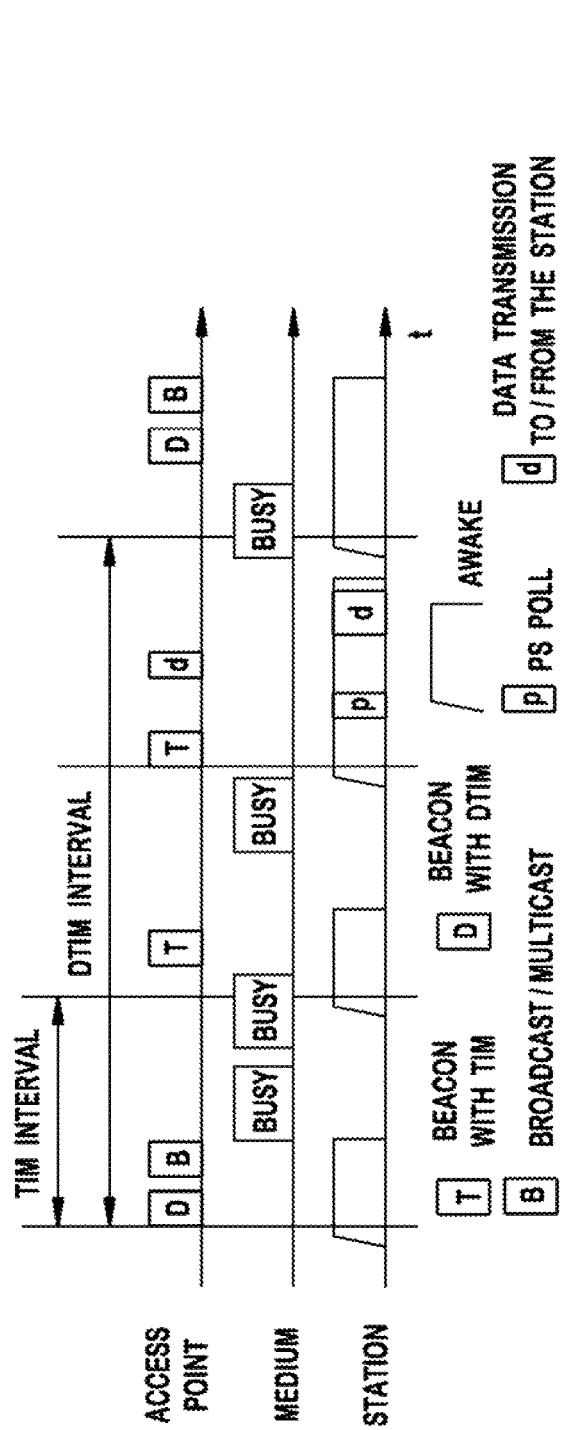

FIG. 6A

| OPTION | UL MAX INTERVAL | UL MIN INTERVAL | UL DATA RATE | UL DATA PRIORITY | DL MAX INTERVAL | DL MIN INTERVAL | DL DATA RATE | DL DATA PRIORITY |
|---|---|---|---|---|---|---|---|---|
| 611 | 612 | 613 | 614 | 615 | 616 | 617 | 618 | 619 |

| OPTION | UL MAX INTERVAL | UL MIN INTERVAL | UL DATA RATE | UL DATA PRIORITY | DL MAX INTERVAL | DL MIN INTERVAL |
|---|---|---|---|---|---|---|
| 621 | 622 | 623 | 624 | 625 | 626 | 627 |

| OPTION | WAKE UP MAX INTERVAL | WAKE UP MIN INTERVAL | DATA RATE | DATA PRIORITY |
|---|---|---|---|---|
| 631 | 632 | 633 | 634 | 635 |

| OPTION | START UL BEACON INTERVAL | UL OFFSET | UL FREQUENCY | DL BEACON INTERVAL | DL OFFSET | DL FREQUENCY |
|---|---|---|---|---|---|---|
| 1011 | 1012 | 1013 | 1014 | 1015 | 1016 | 1017 |

| OPTION | WAKE UP BEACON INTERVAL | WAKE UP OFFSET | WAKE UP FREQUENCY |
|---|---|---|---|
| 1021 | 1022 | 1023 | 1024 |

| OPTION | START UL BEACON INTERVAL | UL OFFSET | UL FREQUENCY | UL DURATION | DL BEACON INTERVAL | DL OFFSET | DL FREQUENCY | DL DURATION |
|---|---|---|---|---|---|---|---|---|

| OPTION | WAKE UP BEACON INTERVAL | WAKE UP OFFSET | WAKE UP FREQUENCY | WAKE UP DURATION |
|---|---|---|---|---|

1106

METHOD AND APPARATUS FOR POWER SAVINGS IN A WIRELESS LOCAL AREA NETWORK

CROSS REFERENCE TO RELATED APPLICATIONS

This application is a continuation of U.S. patent application Ser. No. 13/785,445 filed on Mar. 5, 2013, which claims the benefit of U.S. provisional application Nos. 61/607,481 filed Mar. 6, 2012, 61/642,231 filed May 3, 2012, 61/645,957 filed May 11, 2012, 61/669,492 filed Jul. 9, 2012, and 61/696,568 filed Sep. 4, 2012, the contents of which are hereby incorporated by reference herein.

BACKGROUND

A wireless local area network (WLAN) basic service set (BSS) in an infrastructure mode has an access point (AP) for the BSS and one or more stations (STAs) associated with the AP. The AP typically has access or interface to a distribution system (DS) or another type of wired or wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may be sent to through the AP where the source STA sends traffic to the AP and the AP delivers the traffic to the destination STA. Such traffic between STAs within a BSS is peer-to-peer traffic. Such peer-to-peer traffic may be sent directly between the source and destination STAs with a direct link setup (DLS) using an IEEE 802.11e DLS or an IEEE 802.11z tunneled DLS (TDLS). A WLAN in an independent BSS mode has no AP and STAs communicate directly with each other.

New spectrum is being allocated in various countries around the world for wireless communication systems. Such spectrum is often quite limited in the size and also in the bandwidth of the channels. The spectrum may be fragmented in the available channels, and may not be adjacent and may not be combined for larger bandwidth transmissions. Such is the case for example in spectrum allocated below 1 GHz in some countries. WLAN systems, for example built on the 802.11 standards, may be designed to operate in such spectrum. Given the limitations of such spectrum, the WLANs may be able to support smaller bandwidths and lower data rates compared to high throughput (HT) or very high throughput (VHT) WLAN systems for example based on the 802.11n or 802.11ac standards.

SUMMARY

A method and apparatus for power savings in a wireless local area network (WLAN) are disclosed. A station (STA) may receive parameters that associate the STA to a specific group of STAs and perform a channel access during a period that is allowed for the group of STAs based on the parameters. The STA may receive information regarding an access slot that is allowed for the group of STAs and access a channel during the access slot. The STA may receive a schedule for wake up from a doze state and goes in and out of the doze state based on the schedule. A STA may conduct two-way negotiations with the AP on power saving and medium access methods and parameters with the AP at association time or when they are associated, during which the STA may provide information related to the STA's category, traffic type, power saving requirements, or the like.

A highest channel access priority may be provided to a sensor or meter type of STA. The STA may indicate to an access point (AP) that the STA will not listen to a traffic indication map (TIM) or a delivery TIM (DTIM) in a beacon. The AP may then use the STA status information to assemble the partial virtual bitmap in the TIM element for STAs in a power saving mode. The partial virtual bitmap in the TIM may contain positive traffic indications for the STAs in the listening status at the time when the frame containing the TIM element is transmitted.

If the AP transmits a sectorized beacon, the sectorized beacon may contain an indication that the beacon is sectorized, and may indicate a period during which the STA that receives the sectorized beacon is allowed to transmit to the AP.

The STA may receive parameters associated with the group of STAs via a beacon or a short beacon, such that the group of STAs are allowed to access the channel during a certain time period and other group of STAs are not allowed to access the channel during the certain time period.

The STA receives a frame including an ACK indication field that indicates that there is a non-zero value contained in a duration field in a medium access control (MAC) header of the frame and indicates a presence of a frame that is not an ACK frame or a block ACK frame.

BRIEF DESCRIPTION OF THE DRAWINGS

A more detailed understanding may be had from the following description, given by way of example in conjunction with the accompanying drawings wherein:

FIG. 2 shows an example of traffic indication map (TIM) and delivery TIM (DTIM) operation;

FIG. 3 shows a frame format for the Traffic Specifications (TSPEC) information element (IE);

FIGS. 6A-6C show alternative formats of the Traffic Spec field in the PSS IE;

FIGS. 10A and 10B show example formats for the Schedule Spec field in the PSR IE;

FIGS. 11A and 11B are another example formats of the Schedule Spec field in the PSR IE;

DETAILED DESCRIPTION

Figure 1A:
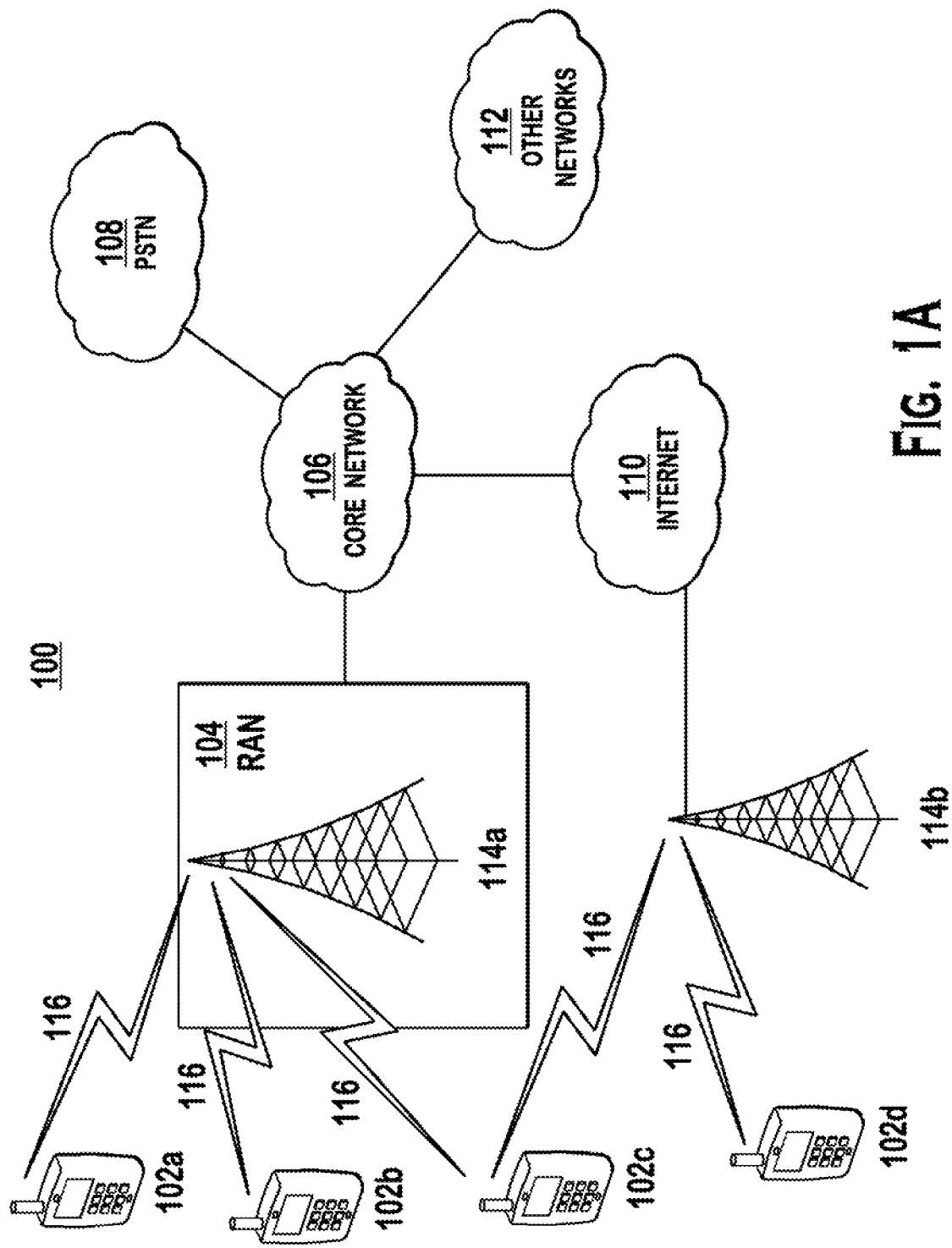
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
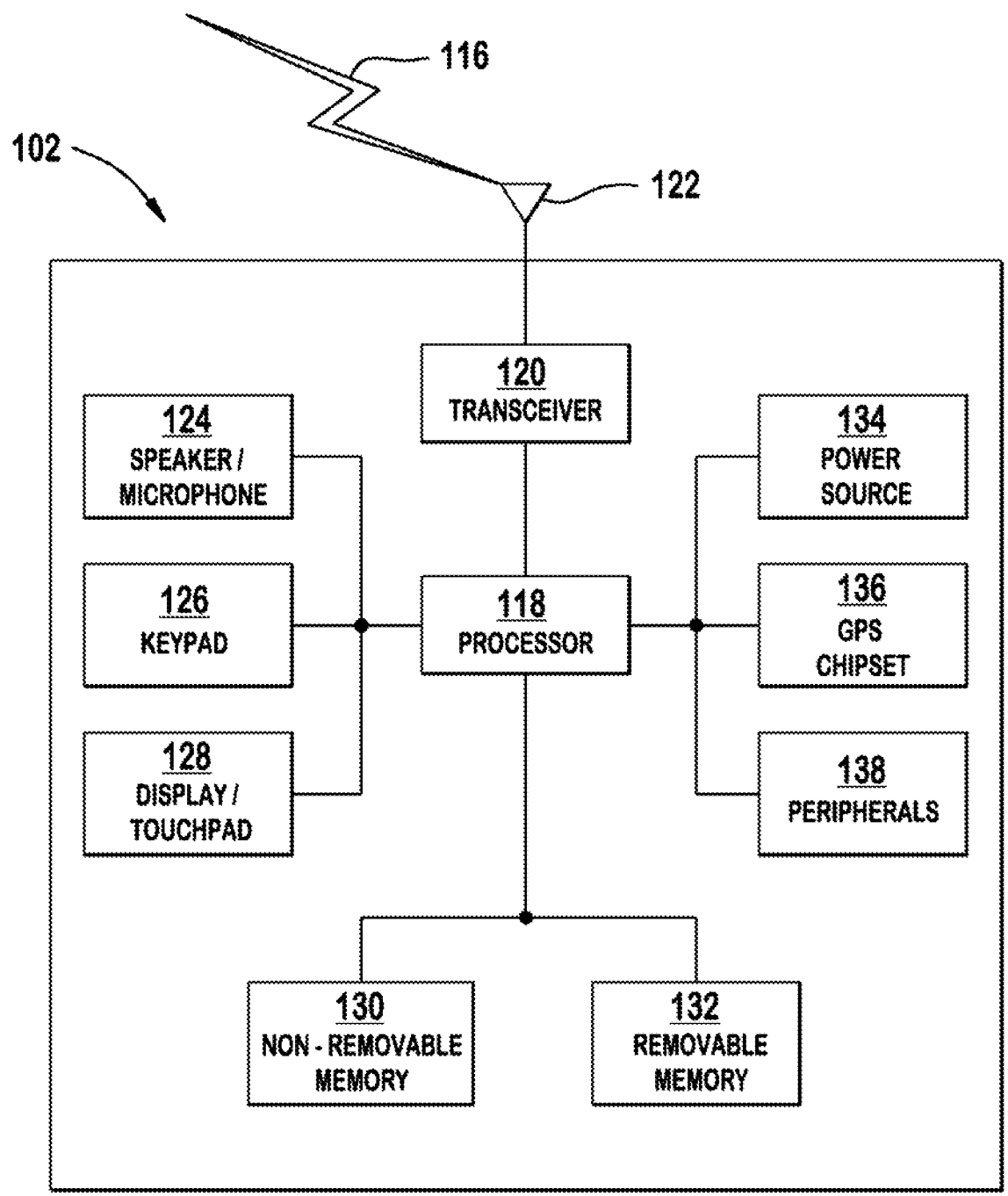
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
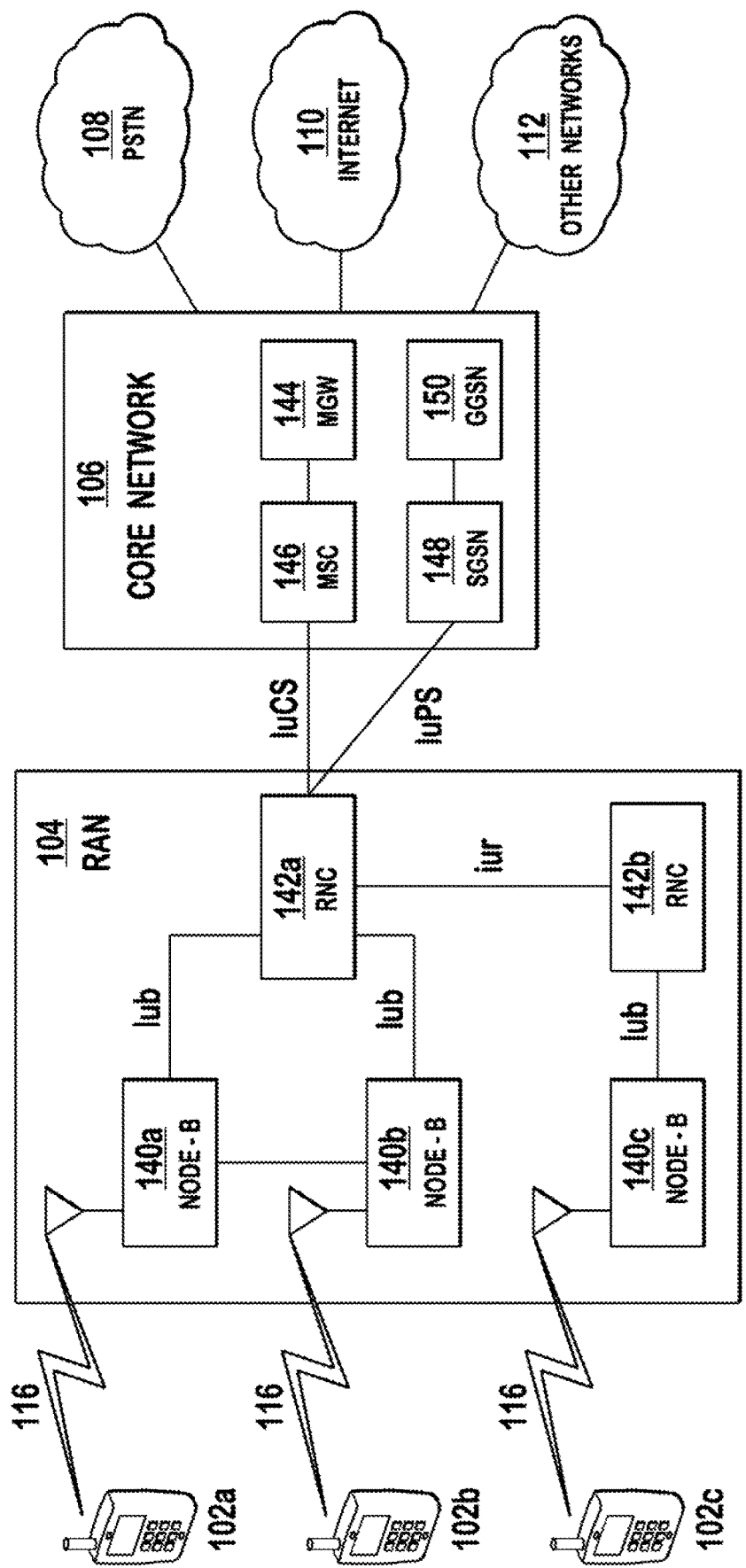
FIG. 1C is a system diagram of an example radio access network and an example core network that may be used within the communications system illustrated in FIG. 1A.

FIG. 1C is an example system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

The IEEE 802.11ah Task Group (TG) has been established to develop solutions to support a WiFi system in sub 1 GHz band. The following use cases have been adopted by the 802.11ah TG: sensors and meters (use case 1), backhaul sensor and meter data (use case 2), and extended range Wi-Fi for cellular offloading (use case 3).

In 802.11ah, one of the use cases is meters and sensors, in which up to 6,000 STAs may be supported within a single BSS. The devices such as smart meters and sensors have very different requirements pertaining to the supported uplink and downlink traffic. For example, sensors and meters may be configured to periodically upload their data to a server which may most likely be uplink traffic. Sensors and meters may be queried or configured by the server. When the server queries or configures a sensor and a meter, the queried data may need to arrive within a setup interval, and a confirmation for any configuration performed may need to arrive within a certain interval. These types of traffic patterns are very different than the traditional traffic patterns assumed for the WLAN systems.

Power saving mechanisms have been defined in the 802.11 systems. A station (STA) may transition between an awake state and a doze (sleep) state for power saving. An AP is aware of the power saving mode of the STAs and buffers traffic for the STAs in a doze state, and may notify the STAs using a traffic indication map (TIM) or a delivery TIM (DTIM) in beacon or short beacon frames. The TIM is indicated using an association identifier (AID) bitmap or partial virtual bitmap. A STA may determine that buffered data is for it by receiving and interpreting the TIM.

A STA saves power by entering into a doze state and waking up to listen for a beacon or a short beacon. The STA checks the TIM to determine whether the AP has buffered frames for the STA. A STA may send a PS-Poll control frame to the AP to retrieve the buffered frames from the AR STAs in the WLAN may use the random back-off mechanism before transmitting the PS-Poll frame when multiple STAs have buffered frames at the AP. FIG. 2 shows an example of TIM and DTIM operation.

In a BSS operating under the distributed coordination function (DCF) or during the contention period (CP) of a BSS using the point coordination function (PCF), upon determining that data is currently buffered for a STA in the AP, the STA operating in the power save (PS) mode may transmit a short PS-Poll frame to the AP, which may respond with the data immediately, or acknowledge the PS-Poll frame and respond with the data at a later time. If the TIM indicating the buffered data is sent during a contention free period (CFP), a CF-Pollable STA operating in the PS mode may not send a PS-Poll frame, but remains active until the buffered data is received (or the CFP ends).

At every beacon interval, the AP may assemble the partial virtual bitmap containing the buffer status per destination for STAs in the PS mode and may indicate this in the TIM field of the beacon frame. At every beacon interval, the Automatic Power Save Delivery (APSD)-capable AP may assemble the partial virtual bitmap containing the buffer status of non-delivery-enabled access categories (ACs) (if there exists at least one non-delivery-enabled AC) per destination for STAs in the PS mode and may send this out in the TIM field of the beacon frame. When all ACs are delivery-enabled, the APSD-capable AP may assemble the partial virtual bitmap containing the buffer status for all ACs per destination. If flexible multicast service (FMS) is enabled, the AP may include an FMS Descriptor element in every beacon frame. The FMS Descriptor element may indicate FMS group-addressed frames that the AP buffers.

The maximum length of information element (IE) in the current 802.11 standards is 256 bytes. Consequently, this maximum IE size sets up a limitation to the number of STAs that can be supported in the TIM, as the TIM uses bitmap to signal the STAs with buffered data by mapping the STA's AIDs to the bits in the bitmap. In addition to the bitmap field, the TIM also contains other information fields, (e.g., DTIM Count, DTIM Period, and Bitmap Control). Therefore, the maximum size of the bitmap field in the TIM is further limited to 251 bytes.

Moreover, for the current maximum 2,007 AIDs, the worst case, (i.e., the full bitmap), needs 2,007 bits, i.e., 2,007/8=251 bytes, which reaches the maximum size of the bitmap field in TIM. Therefore, the current TIM with its bitmap structure may not meet the 802.11ah functional requirements of supporting a large number of STAs beyond 2,007.

In addition, the length of the TIM increases as the number of supported STAs increases, based on the current TIM structure as specified in the 802.11 standards. For example, with maximum 2,007 STAs, the worst case bitmap in TIM is 251 bytes. If the maximum number of stations is increased to a much larger number, say 6,000, then the worst case bitmap would be 6,000/8=750 bytes. Such a large size TIM will increase the overhead of TIM per beacon transmission, which is a highly unacceptable level, particularly in the 802.11ah systems where the channel bandwidth, (e.g., 1 MHz, 2 MHz, up to 8 MHz), is much smaller than other 802.11 systems, (e.g., 802.11n/11ac).

The 802.11e standards include an extension of the 802.11 power save mode defined as Automatic Power Save Delivery (APSD). If the AP supports APSD, 802.11e capable STAs may select the method for the delivery of the frames buffered at the AP between normal power save mode and APSD. A difference between the normal 802.11 standard power save mode and APSD is that with APSD a STA is awake during a service period (SP) instead of being awake from the transition to the awake state for receiving a beacon until returning to the doze state after acknowledging receipt of the last frame buffered at the AP. Two types of SPs are defined in APSD: unscheduled APSD (U-APSD) and scheduled (S-APSD). U-APSD is defined for STAs accessing the channel using Enhanced Distributed Channel Access (EDCA) while S-APSD is defined for both access mechanisms, EDCA and Hybrid Coordination Function (HCF) Controlled Channel Access (HCCA).

In U-APSD, a STA sets an access category (AC) to be trigger-enabled or delivery-enabled. The MAC service data units (MSDUs) from delivery-enabled AC may be buffered. A STA wakes up and transmits a trigger frame to the AP to retrieve the buffered MSDUs or management frames during unscheduled service period. If there is no unscheduled service period (SP) in progress, the unscheduled SP begins when the AP receives a trigger frame from a STA, which is a QoS data or QoS null frame associated with an AC the STA has configured to be trigger-enabled. An unscheduled SP ends after the AP has attempted to transmit at least one MSDU or MAC protocol data unit (MPDU) associated with a delivery-enabled AC and destined for the STA. QoS null frames are the substitutes in U-APSD of PS-Polls in standard power save mode to allow a STA to request the delivery of the frames buffered at the AP even if the STA has no data frame to transmit in the uplink.

In S-APSD, a STA first associates with an AP. Depending on the AC of a particular traffic stream (TS), the STA may request scheduled controlled channel access or contention-based channel access by sending an ADDTS Request frame including Traffic Specifications (TSPEC) to the AP. FIG. 3 shows a frame format for the TSPEC IE. The AP may respond with an ADDTS Response frame including a Schedule IE if the AP can accommodate the TS.

The Power-Save Multi-Poll (PSMP) mechanism has been introduced in 802.11n. In PSMP, a single PSMP frame may be used to schedule multiple STAs. It could be efficient where STAs transmit small amount of data periodically.

Figure 4:
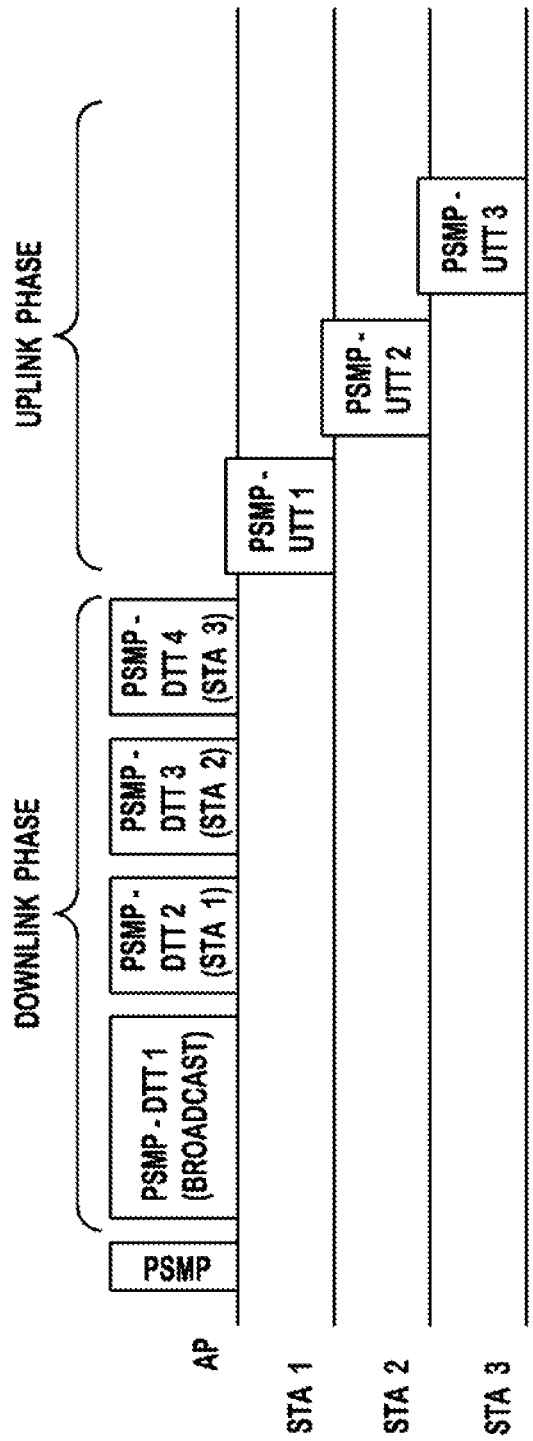
FIG. 4 shows an example of Power Save Multi Poll (PSMP) operation of three STAs.

Power consumption is reduced by providing UL and DL schedule at the start of the PSMP phase so that each STA may shut down their receivers until needed in the DL phase and transmit when scheduled during the UL phase without performing clear channel assessment (CCA). FIG. 4 shows an example of PSMP operation of three STAs.

Power saving may be achieved through two-way negotiations between a STA and an AP. A STA and an AP may exchange messages for exchanging power saving parameters and configuring power saving and sleep schedules.

In one embodiment, one unified information element (IE) may be defined to address power saving aspects. Hereafter, the unified IE will be referred to "power saving specification (PSS) IE." A STA may send the PSS IE to an AP in a probe request frame, an association request frame, or the like. With the PSS IE, one round of packet exchanges between the STA and the AP may be sufficient for configuring power saving and sleep schedules.

Figure 5:
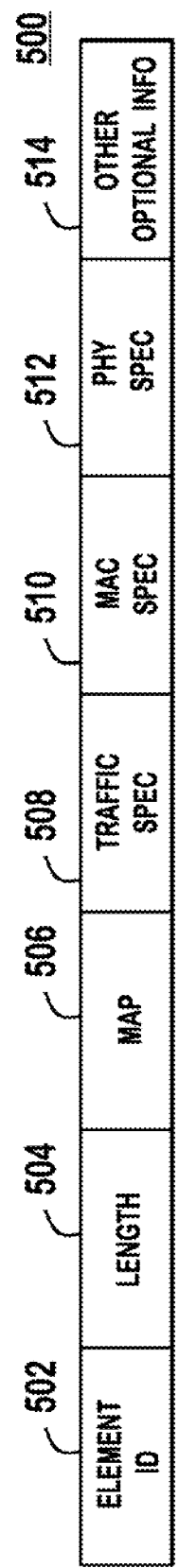
FIG. 5 shows an example format of the power saving specification (PSS) IE.

FIG. 5 shows an example format of the PSS IE 500. The PSS IE 500 may have the following fields: Element ID 502, Length 504, MAP 506, Traffic Spec 508, MAC Spec 510, PHY Spec 512, and Other Optional Info 514 fields.

The Element ID field 502 is set to an ID identifying that this is a PSS IE. The Length field 504 indicates a length in octets in the remainder of the IE. The MAP field 506 is information contained in the PSS IE. The Traffic Spec field 508 is the specification of uplink and downlink traffic patterns. The MAC Spec field 510 is the specification of MAC parameters and preferences related to power saving. The PHY Spec field 512 is the specification of PHY parameters and preferences related to power saving. The Other Optional Info field 514 includes other information that is related to power saving, such as the duration for which the power saving specifications are expected to be valid starting at the end of the frame containing the PSS IE 500. The Traffic Spec field 508 may include different information depending on implementation. The Traffic Spec field 508 is adherent to the traffic patterns and use case that a STA may support.

FIGS. 6A-6C show alternative formats of the Traffic Spec field 508 in the PSS IE. The format in FIG. 6A may be used in a use case of cellular offloading in which both UL and DL traffic need to be specified. The Traffic Spec field 610 in this case may include the following subfields: Option 611, UL Max Interval 612, UL Min Interval 613, UL Data Rate 614, UL Data Priority 615, DL Max Interval 616, DL Min Interval 617, DL Data Rate 618, and DL Data Priority 619 subfields. The Option subfield 611 indicates which type of Traffic Spec is used (among the formats in FIGS. 6A-6C). The UL Max Interval subfield 612 indicates the maximum service interval for UL traffic. The UL Min Interval subfield 613 indicates the minimum service interval for UL traffic. The UL Data Rate subfield 614 indicates the data rate and/or size that the AP should support within one UL service interval. The UL Data Priority subfield 615 indicates the priority of the UL data. The DL Max Interval subfield 616 indicates the maximum service interval for DL traffic. The DL Min Interval subfield 617 indicates the minimum service interval for DL traffic. The DL Data Rate subfield 618 indicates the data rate and/or size that the AP should support within one DL service interval. The DL Data Priority subfield 619 indicates the priority of the DL data.

The format in FIG. 6B may be used in a use case of sensor or meter backhaul in which UL traffic has a high volume and DL traffic is sporadic and mainly includes relaying sensors' and meters' query of configuration message. The Traffic Spec field 620 in this case may include the following subfields: Option 621, UL Max Interval 622, UL Min Interval 623, UL Data Rate 624, UL Data Priority 625, DL Max Interval 626, and DL Min Interval 627 subfields. The definition of the subfields 611-627 is the same as the subfields 611-617 in FIG. 6A.

The format in FIG. 6C may be used for the use case of sensors and meters in which UL traffic may comprise periodic sensor and meter readings or sporadic event driven reporting such as fire reporting, and DL traffic is sporadic and mainly comprises sensors' and meters' query of configuration messages. The Traffic Spec field 630 in this case may include the following subfields: Option 631, Wake Up Max Interval 632, Wake UP Min Interval 633, Data Rate 634, and Data Priority 635 subfields. The Option subfield 631 indicates which type of Traffic Spec is used (among the formats in FIGS. 6A-6C). The Wake Up Max Interval subfield 632 indicates the maximum interval for the STAs to wake up to transmit UL traffic or receive DL traffic if any is available. The Wake UP Min Interval subfield 633 indicates the maximum interval for the STAs to wake up to transmit UL traffic or receive DL traffic if any is available. The Data Rate subfield 634 indicates the data rate and/or size that the AP should support within one wake up interval. The Data Priority subfield 635 indicates the priority of the UL data. For example, if a STA reports a detected fire within 1 second and it needs to confirm any query or configuration within 5 seconds, and the STA has a battery life that limits its wakeup frequency to be less than twice in 1 second, then its [Wake Up Max Interval, Wake Up Min Interval]=[1 s, 0.5 s].

Conventionally, no access category (AC) is defined to address the priority setting of sensors and meters. In one embodiment, one or more priority categories may be defined for sensors and meters. For example, the new priority category may entail the following priority settings: regular reporting (e.g., temperature, humidity measurement, etc.), elevated priority reporting (e.g., device running out of battery, sensor reading approaching pre-set threshold, etc.), emergency (e.g., intruder, fire detection, etc.), and red alert (e.g., patient heart attack, dangerous gas release, etc.).

The new priority category for sensors and meters may belong to a large category or access category, for example, named sensors/meters. Different priority categories may be differentiated using all or a subset of the EDCA parameters within the access category. The one or more additional access priority categories for sensors and meters may be associated with their own channel access quality of service (QoS) parameters such as initial contention window sizes, maximum contention window sizes, different inter-frame spaces such as arbitration inter-frame space (AIFS) associated with the new priority categories, etc. The new priority categories for sensors and meters may be of higher or lower priorities compared to the existing access categories. The additional priority categories for sensors and meters may be related to the type of STAs, such as the application of the sensors, battery life durations and status, etc.

Figure 7:
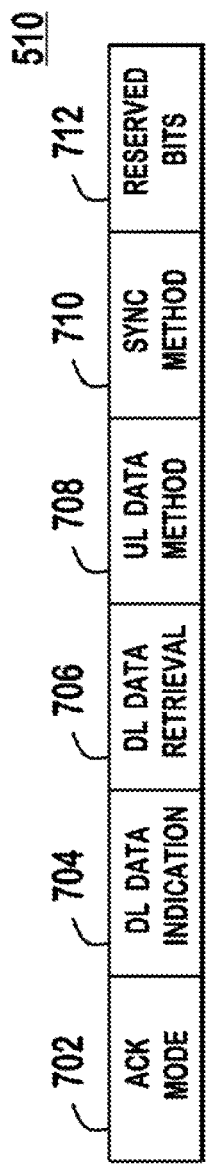
FIG. 7 shows an example format of the medium access control (MAC) Spec field in the PSS IE.

The MAC Spec field 510 indicates the power saving related MAC parameters and preference for the STA. FIG. 7 shows an example format of the MAC Spec field 510 in the PSS IE 500. The MAC Spec field 510 may include the following subfields: ACK Mode 702, DL Data Indication 704, DL Data Retrieval 706, UL Data Method 708, and SYNC Method 710 subfields, and Reserved Bits 712.

The ACK Mode subfield 702 indicates the acknowledgement (ACK) mode for the STA's UL traffic, (e.g., regular ACK, delay block ACK (BA), no ACK, etc.). The DL Data Indication subfield 704 indicates the way an AP may indicates the presence of buffered DL data for the STA, (e.g., TIM/DTIM in beacon, UL poll (e.g., the STA does not listen to the TIM/DTIM in the beacon), DL unicast, short beacon with TIM, PSMP schedule, etc.). The DL Data Retrieval subfield 706 indicates the way that a STA may retrieve the buffered DL data from the AP, (e.g., DL PSMP slot, UL poll, contention-based uni-cast, etc.). The UL Data Method subfield 708 indicates the way that a STA may transmit its UL data to the AP, (e.g., UL PSMP slot, reverse directional grant (RDG), contention-based channel access, DL poll, etc.). The SYNC Method subfield 710 indicates the way that a STA may stay synchronized to the AP when going into a doze state for an extended period of time, (e.g., no additional synchronization, AP-STA two-way calibration, etc.). The reserved bits 712 may be used for other power saving related MAC parameters and preferences. For example, the reserved bits 712 may be used for indications for capability or preference of using short or compressed MAC header or negotiation protocols for short or compressed MAC header. In addition, the reserved bits 712 may include the options for the short or compressed MAC frame format or compressed MAC header such as which fields may be contained in the short or compressed MAC header. For example, the MAC preference may indicate whether a QoS field may be included in the short or compressed MAC header.

Figure 8:
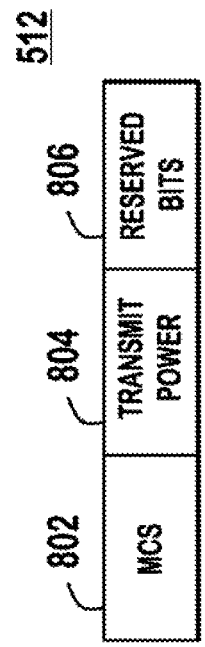
FIG. 8 shows an example format for the physical layer (PHY) Spec field.

The PHY Spec field 512 indicates the power saving related PHY parameters and preference for the STA. FIG. 8 shows an example format for the PHY Spec field 512. The PHY Spec field 512 may include an MCS suhfield 802, a Transmit Power subfield 804, and reserved bits 806. The MCS subfield 802 indicates a modulation and coding scheme (MCS) to be used by the AP to transmit to the STA. For example, this may be useful when the STA indicates that no ACK is used and wants that the AP uses a more robust MCS to avoid transmission errors. In addition, if sensors or meters do not have multiple-input multiple-output (MIMO) capabilities, the MCS subfield 802 may indicate that they are not capable of MIMO MCS. The MCS may be estimated by the STA by listening to AP's beacon or other type of frames that the STA received from the AP. The estimated MCS value may change during the period that the STA is associated with the AP. The Transmit Power subfield 804 indicates the transmit power to be used when the STA transmits to the AP and when the AP transmits to the STA. The reserved bits 806 may be used for other power saving related PHY parameters and preferences.

It should be noted that the PSS IE 500 or any subset of the subfields of the PSS IE 500 may be implemented as a subfield or subsets of subfields of any conventional or new IE, or as a part of any control or management frames or MAC/physical layer convergence protocol (PLCP) headers. In addition, any subset of the elements, (e.g., priority, schedule requirements, traffic types, DL/UL traffic indication methods, etc.), in the PSS IE 500 may be combined with other types of information (such as capabilities, etc.) to represent STA categories that are pre-defined or agreed on by the STAs and the APs. APs, after receiving the information on STA categories and/or the characteristics associated with the STA categories, either implicitly or explicitly, may behave according to the characteristics or STA categories, which will be explained in more detail below.

A Power Saving Response (PSR) IE may be sent in response to the PSS IE. For example, after receiving a probe request frame including a PSS IE, the AP may respond with a probe response including a PSR IE. If the AP receives an association request frame including a PSS IE, the AP may respond with an association response frame including a PSR IE.

Figure 9:
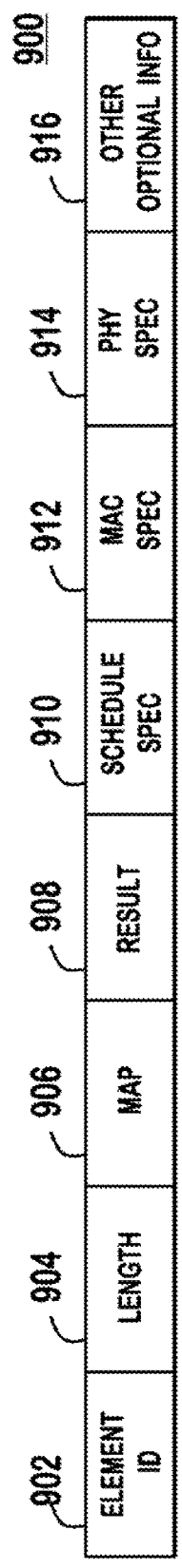
FIG. 9 shows an example format of a power saving response (PSR) IE.

FIG. 9 shows an example format of an PSR IE 900. A PSR IE 900 may include following fields: Element ID 902, Length 904, MAP 906, Result 908, Schedule Spec 910, MAC Spec 912, PHY Spec 914, and Other Optional Info 916 fields.

The Element ID field 902 is an ID to identify that this is a PSR IE. The Length field 904 indicates the length in octets in the remainder of the IE. The MAP is information contained in the PSR IE 900. The Result field 908 contains an indication whether the STA transmitting the PSS IE could be accommodated, and if not, whether a proposed schedule is included in the remainder of the PSR IE 900. The possible values of the Result field 908 may be: Successful, Successful_With_Assigned_Schedule, Fail, Fail_UL_Support, Fail_DL_Support, Fail_UL_DL_Support, Fail_MAC_Spec, Fail_PHY_Spec, Fail_With_Proposed_Schedule, or the like. The Schedule Spec field 910 indicates the specification of the assigned schedule in case the STA with power saving specifications indicated by the PSS IE can be supported, or proposed schedule in case the STA power saving specifications indicated by the PSS IE cannot be accommodated. The MAC Spec field 912 indicates the specifications of MAC parameters and preferences related to power saving, which may be identical to the MAC Spec field 510 in the PSS IE 500. The PHY Spec field 914 indicates the specifications of PHY parameters and preferences related to power saving, which may be identical to the PHY Spec field 512 in the PSS IE 500. The Other Optional Info field 916 may be used for other information that is related to power saving, such as the duration for which the assigned schedule is expected to be valid starting at the end of the frame containing the PSR IE 900.

FIGS. 10A and 10B show example formats for the Schedule Spec field in the PSR IE. The Schedule Spec field may have include different information depending on the Traffic Spec field contained in the PSS IE.

The Schedule Spec field format in FIG. 10A may be used for the use case of cellular offloading or sensor backhaul in which both UL and DL traffic need to be specified. The Schedule Spec field 1010 may include the following subfields: Option 1011, Start UL Beacon Interval 1012, UL Offset 1013, UL Frequency 1014, Start DL Beacon Interval 1015, DL Offset 1016, and DL Frequency 1017.

The Option subfield 1011 may indicate which type of Schedule Spec is used. The Start UL Beacon Interval subfield 1012 indicates the start beacon interval in which the UL traffic starts. Since a beacon cannot always be transmitted at the target beacon transmission time (TBTT), the Start UL Beacon Interval subfield 1012 may refer to the TBTT of the beacon that commences the targeted beacon interval or a particular value of the timer synchronization function (TSF) timer. The UL Offset subfield 1013 indicates the UL interval offset in microsecond or any other time unit from the beacon, TBTT, or a reference point of time of the TSF timer. The UL Frequency subfield 1014 indicates how often the UL transmission is repeated defined in number of beacon intervals, mircoseconds, or other time units. The Start DL Beacon Interval subfield 1015 indicates the start beacon interval in which the DL traffic starts. Since a beacon cannot always be transmitted at the TBTT, the Start DL Beacon Interval subfield 1015 may refer to the TBTT of the beacon that commences the targeted beacon interval or a particular value of the TSF timer. The DL Offset subfield 1016 indicates the DL transmission offset in microsecond or any other time unit from the beacon, TBTT, or a reference point of time of the TSF timer. The DL Frequency subfield 1017 indicates how often the DL transmission is repeated defined in number of beacon intervals, mircoseconds, or other time units.

The Schedule Spec field format 1020 in FIG. 10B may be used for the use case of sensors and meters in which wakeup interval needs to be specified. The Schedule Spec field 1020 may include Option 1021, Start Wakeup Beacon Interval 1022, Wakeup Offset 1023, and Wakeup Frequency 1024 subfields.

The Option subfield 1021 indicates which type of Schedule Spec is used. The Start Wakeup Beacon Interval subfield 1022 indicates the start beacon interval in which the STA may wake up. Since a beacon cannot always be transmitted at the TBTT, the Start Wakeup Beacon Interval subfield 1022 may refer to the TBTT of the beacon that commences the targeted beacon interval or a particular value of the TSF timer. The Wakeup Offset subfield 1023 indicates the wakeup interval offset in microsecond or any other time unit from the beacon, TBTT, or a reference point of time of the TSF timer. The Wakeup Frequency subfield 1024 indicates how often the STAs may wakeup, defined in number of beacon intervals, mircoseconds, or other time units.

All the timing related parameters disclosed herein may be implemented in any time units and with any reference. For example, the reference time may be the TSF timer time or the Greenwich Mean Time (GMT) time.

FIGS. 11A and 11B are another example formats of the Schedule Spec field in the PSR IE 900. The UL Duration subfield 1102 specifies the duration of the UL period during which the STA may conduct UL access such as the transmission of PS-Poll, data frames or other frames. The DL Duration subfield 1104 specifies the duration of the DL period during which the STA may expect DL transmissions from the AP such as the transmission of PS-Poll, data frames, or other frames. The DL transmission may be preceded by the indication by the AP in the TIM (e.g., in a beacon or short beacon) of any buffered DL packets at the AP for the STA. The Wake up Duration subfield 1106 specifies the duration of the wakeup period during which the STA may wake up. During the wakeup period, the STA may listen to the TIM in beacon, short beacon or other types of management or control frames, transmit UL PS-Poll to the AP to inquire of any buffered packets or to retrieve DL packets, receive DL data or other types of frames from the AP, conduct UL transmissions of data frames to the AP, and/or require synchronization information from the AP in order to re-synchronize with the AP's TSF timer or other reference timer.

In another embodiment, the AP may include in the Schedule Spec field 910 parameters for the STA that may relate to the group(s) to which the STA belong. The AP may control DL and UL channel access for the STAs using any of the broadcast or uni-cast management, control, data, or other types of frames using the parameters that are assigned to a group of STAs. For example, the AP may include in the Schedule Spec field 910 one or more IDs of the group(s) the STA belongs to. The AP may subsequently include IDs of groups or other information associated with a group of STAs to allow a subset of STAs to access the medium in its beacons or short beacons. With this scheme, different groups of STAs may access different portions of a beacon interval or beacon sub-intervals.

The complete scheduling may be obtained using the combination of Schedule Spec 910 and MAC Spec 912 fields. For example, if the Schedule Spec format of FIG. 10A or FIG. 11A is used and the MAC Spec field indicates that the DL indication is DTIM in beacon, DL data retrieval is PSMP slots, and UL data method is contention-based unicast, then the STA may start to access the medium using contention-based method in the start UL beacon interval with a timing offset of UL offset from the end of the beacon and repeat the process every UL frequency beacon intervals after that. The STA may also listen to the DTIM in the beacon starting in the start DL beacon interval and every DL frequency beacon interval after that. If the DTIM indicates that a packet is buffered for the STA, the STA may wakeup again at DL offset counting from the end of the beacon to receive the buffered packet using its assigned PSMP slot. Alternatively, the beacon may contain a new PSMP schedule which the STA may follow.

It should be noted that the PSR IE 900 or any subset of the subfields of the PSR IE 900 may be implemented as a subfield or subsets of subfields of any conventional or new IE, or as a part of any control or management frames or MAC/PLCP headers.

In another embodiment, the AP, in order to accommodate different needs in different use cases, may divide a beacon interval into several sub-intervals. Since some STAs may need to upload and download packets periodically, some other STAs may need to wake up to listen for configuration and query packets, and yet some other STAs may upload packets when some pre-defined events occurred, the AP may divide one or more beacon interval into one or more sub-intervals and assign different access polices for each of them. For example, a beacon interval may be divided into one or more of the following sub-intervals: a scheduled sub-interval, which may comprise DL and UL PSMP intervals after some offset of time after the beacon, a sub-interval where regular contention-based medium access is used (for example for unexpected wakeups of STAs and for newly arrived STAs to perform association), and/or a sub-interval where STAs of high priority may transmit using contention-based medium access, and the like.

Figure 12:
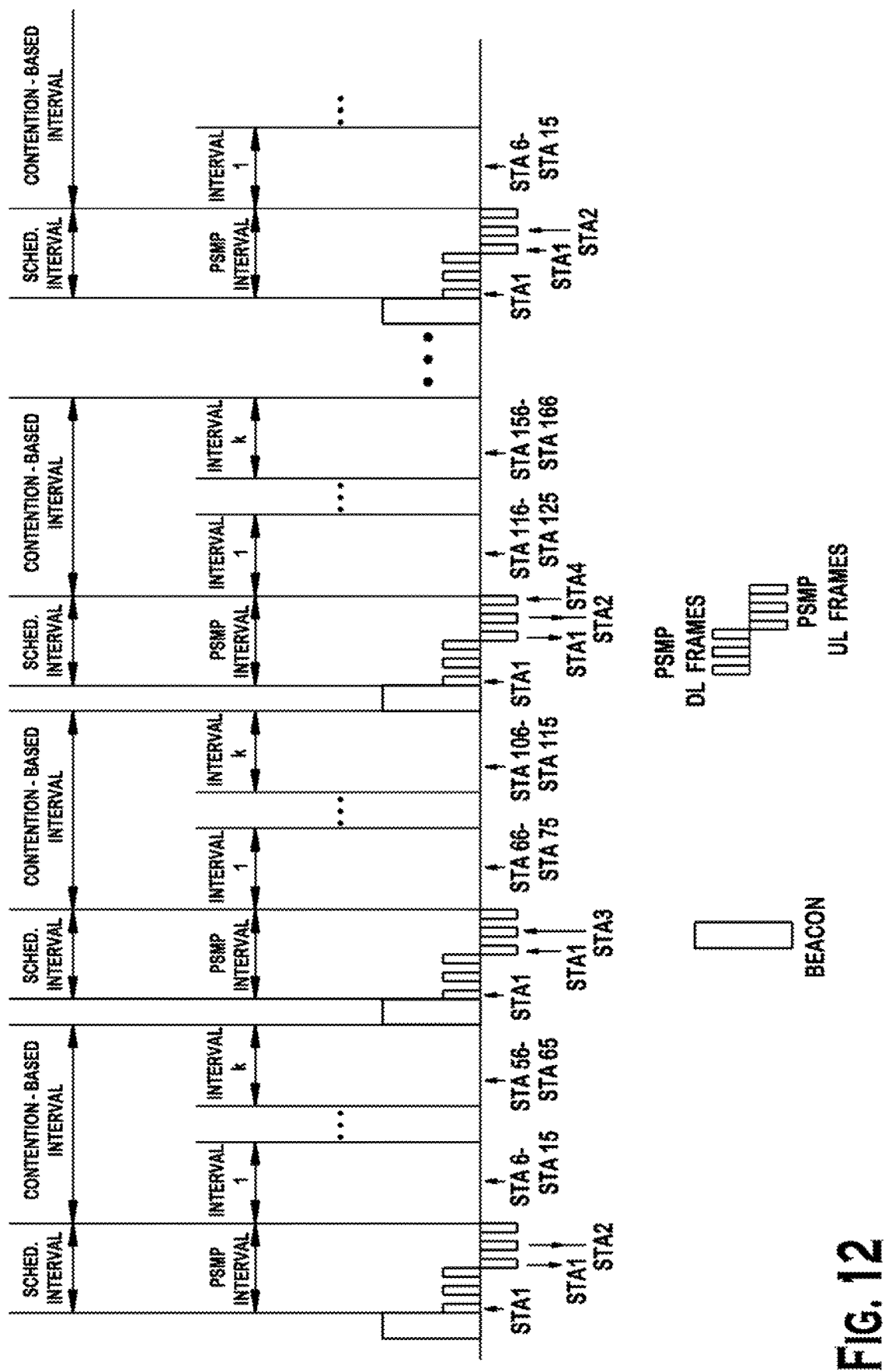
FIG. 12 shows an example of beacon interval division and schedule assignment for STAs by an AP.

FIG. 12 shows an example of beacon interval division and schedule assignment for STAs by an AP. In this example, each beacon interval comprises a beacon period, a scheduled interval, and a contention-based interval. Even though FIG. 12 shows that for each beacon interval, one scheduled interval is included, there could be multiple scheduled intervals in a beacon interval which may or may not be implemented using the PSMP mechanism. There may also be multiple contention-based intervals in a beacon interval where STAs may wake up to transmit or receive based on various criteria, such as STA priorities, battery life requirement, delay bound, etc.

A beacon sub-interval (e.g., PSMP interval, interval 1, . . . , interval k in FIG. 12) may be started by a short beacon (not shown in FIG. 12). The short beacon that may be at the start of a beacon sub-interval may include parameters for UL channel access, such as the ID of a group of STAs or other parameters that may be associated with a particular group of STAs that may conduct UL channel access in the coming beacon sub-intervals.

Beacon interval division may be implemented in other ways. For example, one or more beacon intervals may be used for contention-based channel access for one or more groups of STAs while one or more beacon intervals may be used for contention free channel access for one or more groups of STAs. Beacon intervals or sub-intervals may be used by one or more groups of STAs. The STAs may be grouped based on schedule requirements, QoS requirements, sleeping schedules, type of STAs, spatial locations, channel characteristics, STA capabilities and preferences, etc.

The AP may assign different wake up schedules for the STAs depending on various criteria, for example, based on the PSS IE that the STA transmitted to the AP in a probe request frame, an association or re-association request frame, or any other management and control frames. If a STA did not manage to transmit or receive packets during its assigned time, the STA may use another contention-based interval, which may be specially designated for that purpose or purposely lightly scheduled, to complete its transmission and/or reception. A newly arrived STA, which may not have a schedule, may use one or more contention-based intervals, which may be specially designated for that purpose or purposely lightly scheduled, to conduct probing, association, etc.

In order to enable co-existence with overlapping BSSs, the AP may schedule a portion, and not all, of its beacon intervals. Alternatively, the AP may coordinate with neighbor APs in the overlapping BSS which portion(s) of its beacon intervals should be the scheduled portions and/or how many STAs to be scheduled for contention-based intervals to allow fair allocation of resources in overlapping BSSs.

An example of an assigned schedule is shown in FIG. 12. In FIG. 12, it is assumed that STA1-STA4 have a high priority and periodic packets to transmit and/or to receive from the AP, STA1 wakes up every beacon interval and needs to transmit and receive periodic packets to and from the AP, STA2 needs to wake up every two beacon intervals to transmit a packet to the AP, and STA3 and STA4 need to wake up every several number of beacon intervals to transmit to the AP. STA6-STA166 and potentially many other STAs may have periodic packets to transmit to, and receive from, the AP. In the example in FIG. 12, STA1 is scheduled to wake up each beacon interval to use one UL and one DL PSMP slot and go back to a doze state for the remaining period of time, STA2 is scheduled to wake up every two beacon intervals to use one UL PSMP slot and go back to a doze state for the remaining period of time, STA3 and STA4 are scheduled to wake up every two beacon intervals to use one UL PSMP slot and go back to a doze state for the remaining period of time, STA6-STA 15 are scheduled to wake up every N beacon intervals to use interval 1 to transmit and receive their packets using contention-based medium access, and STA16-STA166 are scheduled to wake up every N beacon intervals to use their assigned intervals to transmit and receive their packets using contention-based medium access.

The AP may assign PSMP UL and DL slots for the STAs that have periodic high-priority packets to transmit. For normal or low priority packets, (e.g., when the arrival time of the packets are unpredictable), the AP may assign a group of STAs of similar characteristics to transmit or receive their packets in one or more contention-based intervals.

A beacon or a short beacon may not always be transmitted at the TBTT, for example if the medium is occupied by another STA, (e.g., from an overlapping BSS). In order to adjust for the variation in beacon or short beacon transmission time, scheduling flexibility in the beacon interval divisions may be needed. For example, a beacon sub-interval, during which STAs that have a positive TIM indication in the beacon or short beacon may retrieve their DL data, may follow directly after the beacon or short beacon. If the beacon transmission is delayed, the AP may adjust the number of positive TIM indications in the beacon such that the DL data retrieval beacon interval would be shortened to allow other beacon subintervals to proceed as previously scheduled. For example, without loss of generality, it is assumed that a beacon or short beacon's TBTT is at time 0, the DL data retrieval period for STAs that have positive TIM indication is scheduled to be between the end of the beacon and 40 ms (beacon sub-interval 1), and another group of STAs that do not listen to the beacon or short beacon are scheduled to wake up during the period of 40 ms to 80 ms (beacon sub-interval 2). If the beacon or short beacon is delayed and is transmitted at 7 ms, the AP may then reduce the number of positive TIM indications in the beacon or short beacon so that STAs with positive TIM indication may complete their DL data retrieval at 40 ms, (i.e., the beacon sub-interval 1 ends at 40 ms after the delay of the beacon or short beacon), and the beacon sub-interval 2 may proceed as originally scheduled at 40 ms without any negative impact caused by the delayed beacon or short beacon transmissions. The beacon sub-interval 2 may need to start as originally scheduled since that beacon sub-interval may serve sensor STAs that may not listen to the beacons or short beacons and are scheduled to wake up at 40 ms.

In order to ensure that STAs that listen to the TIM indications would retrieve their DL packets in time, the AP may remove the positive indication for STAs that wake up frequently, such as every beacon interval, to retrieve their packets (such as STAs that are powered by outlets) and have indicated that their packets are not very delay-sensitive (such as background or best effort traffic).

Alternatively, the AP may reduce the duration of one or more beacon sub-intervals that was originally scheduled. The AP may announce the new schedule for these beacon sub-intervals in the beacon or short beacon. In the same example above, if the beacon or short beacon is delayed and is transmitted at 7 ms, the AP may then include a schedule announcement in the beacon or short beacon of reduced duration of beacon sub-interval 1, which now ends promptly at 40 ms, and/or of reduced duration of other beacon sub-intervals. The second beacon sub-interval may then proceed as originally scheduled without any negative impact from the delayed beacon or short transmissions.

Alternatively, the AP may announce the end of a beacon sub-interval using a beacon, a short beacon or other type of control or management frames. In the example above, if the beacon or short beacon is delayed and is transmitted at 7 ms, the AP may then transmit at 40 ms (or at an earlier or later point in time) a short beacon or any other type of control or management frame to announce the end of the beacon sub-interval 1 and the start of the beacon sub-interval 2, for example, by including information of IDs of groups of STAs that may access the subsequent beacon sub-interval(s). The beacon, short beacon or any control or management frame may also serve the synchronization purposes for STAs that may enter or have woken up from the doze state.

In yet another embodiment, the AP may use a beacon, a short beacon, or other types of control or management frames to dynamically adjust the duration and/or access policies of each beacon interval or sub-intervals by including, for example, schedules of one or more beacon sub-intervals, IDs of groups of STAs that may access each beacon interval or beacon sub-interval following the beacon/short beacon, EDCA parameters to be used for the beacon interval or sub-interval for each group of STAs, or the like. By dynamically adjusting the duration and/or access policies of each beacon interval or sub-interval, the AP may provide dynamic support for different traffic load from different groups of STAs, such as a group of event-driven sensors that have bursty data to transmit when detecting a relevant event, or a large group of cellular STAs moving into a coverage area which need offloading, or a burst of DL data for STAs that listen to the TIM. In addition, the AP may provide an appropriate QoS support for a variety of STAs with diverse QoS requirements and dynamic traffic load. STAs may listen to beacons or short beacons and if they determine that they are not allowed to access the coming beacon interval(s) or sub-interval(s), the STAs may enter a doze state and wake up to listen to the next beacon or short beacon. The next beacon or short beacon may provide new access policies for them for future beacon interval(s) or sub-interval(s).

Figure 13:
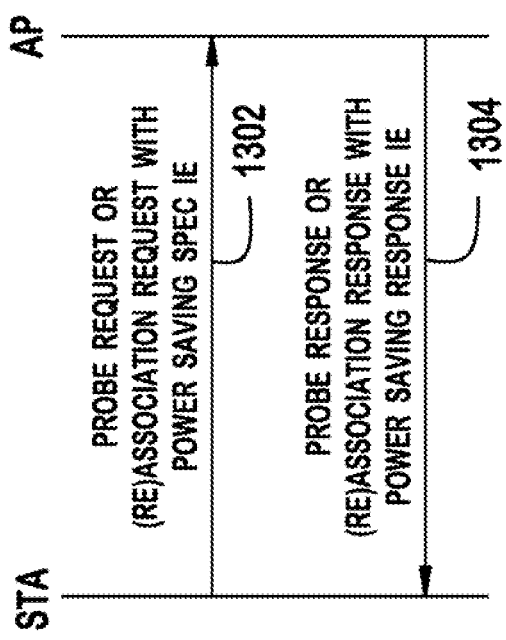
FIG. 13 is a signaling diagram of an example process for power saving through two-way negotiation between an AP and a STA.

FIG. 13 is a signaling diagram of an example process for power saving through two-way negotiation between an AP and a STA. A newly arrived STA may send a probe request frame and/or an (re)association request frame including a PSS IE to the AP (1302). The PSS IE may indicate the needs to be supported by the AP as well its characteristics and preferences, such as capability of short or compressed MAC header, MIMO, etc. The AP determines whether the STA can be supported. The AP sends a probe response frame and/or an (re)association response frame including a PSR IE to the STA (1304).

The AP may divide each beacon interval into several sub-intervals. PSMP intervals comprise PSMP slots, and the AP may use PSMP slots to support STAs with a highest priority and/or very periodic traffic. Multiple intervals/sub-intervals may be allocated for different priorities. The AP may allow certain number of STAs in each beacon interval or sub-interval to ensure that each STA assigned to the beacon interval or sub-interval has a good opportunity to access the channel.

If the STA cannot be supported, the AP may indicate in the probe response frame or the (re)association response frame that the STA cannot be supported and may also indicate a reason why it cannot be supported. Alternatively, the AP may indicate to the STA the maximal traffic and/or MAC and PHY settings that it can support. The STA may send a new probe request or (re)association request frame to the AP with an adjusted PSS IE. Alternatively, if the STA cannot be supported, the AP may not send a probe response frame in response to the probe request frame in order to reduce congestions in the wireless medium.

If the STA can be supported and the PSS IE is received in a probe request frame, the AP may transmit a probe response frame with a PSR IE including the Result field that indicates that the required support can be provided by the AP. The AP may keep the reservation of the resources for a certain period of time, until an association request is received from the STA, or until an association request by the STA to another AP has been overheard.

If the STA can be supported and the PSS IE is received in an (re)association request frame, the AP may group STAs into one or more groups based on criteria such as STA categories, traffic priorities, ACs, schedule requirements, MAC or PHY parameters preference, characteristics and capabilities (e.g., whether a certain MCS may be supported or whether the STAs support MIMO, multi-user MIMO (MU-MIMO), short/compressed MAC header or frames, etc.), and the like. The AP may include parameters related to the assigned group in the PSR IE in any management (e.g., an association response frame), control, or data packets/frames to inform the STA of the assigned group(s).

If the PSS IE is received in an (re)association request frame, the AP informs the STA of the schedule for the STA, MAC Spec, PHY Spec using a PSR IE in the (re)association response frame. The PSR IE may include channel access parameters, such as contention window sizes, AIFS sizes, etc., for the STA, or for a priority classes of STAs, such as sensors, meters, cellular phones, etc., that the STA belongs to. The PSR IE may include MAC and PHY parameters, for example, whether MIMO or MU-MIMO should be used, whether short or compress MAC frame format or frame header should be used, etc.

At each beacon or short beacon, the AP may evaluate the assigned schedule for each STA and include an indication of any buffered packets for the STAs that are scheduled to wake up to listen to the beacon/short beacon. The AP may include in its beacon or short beacon parameters for UL channel access, such as the ID(s) of a group of STAs or other parameters that are associated with a particular group of STAs that may conduct UL channel access in the coming beacon intervals or sub-intervals. Such UL channel access may comprise variety of transmissions, including PS-Polls to retrieve DL data, UL transmission of data and other types of management or control frames such as probe request, authentication request, or (re)association request frames. A group of STAs may be allowed to access multiple beacon intervals or beacon sub-intervals while not allowed to access other beacon intervals or beacon sub-intervals.

The AP may include a duration for access for a group of STAs in a beacon interval or sub-interval. For example, if the AP is capable of transmitting a directional or sectorized beacon or short beacon, the directional or sectorized beacon or short beacon may contain an indication that it is directional or sectorized. In addition, the directional or sectorized beacon or short beacon may indicate a period during which STAs or a group of STAs that received the directional or sectorized beacon or short beacon may attempt to transmit to the AP in a manner that is either contention-free or contention-based. For STAs that have negotiated for DL data indication method, (e.g., UL poll), the AP may not need to include information on buffered packets for them in the beacon, and the STAs may simply wake up according to the schedules and MAC Spec and PHY Spec to transmit a UL poll to the AP to inquire about buffered data. According to the schedules and MAC Spec and PHY Spec, the AP and the STAs may conduct the DL and UL transmissions.

The established schedule may be changed by either an AP or a STA using action frames that contain a PSS or PSR IE. A STA may request a schedule change by transmitting an action frame containing a PSS IE with new Traffic Spec, MAC Spec and PHY Spec fields. For example, the STA may request a change of schedules when the STA is turning off or when a new application has started. The AP may respond with an action frame with a PSR IE that specifies for a new schedule if the new schedule can be supported. The AP may also respond with an action frame with a PSR IE in which the Schedule Spec is set to all '0's which will delete any existing schedules.

The AP may request a schedule change by transmitting an action frame or any management or control frames containing a new PSR IE with new Schedule Spec, MAC Spec and PHY Spec fields. For example, the AP may request a change of schedules when the AP needs to support other STAs of higher priority or when the interference has increased or decreased. The AP may transmit an action frame or any management or control frames with a PSR IE in which the Schedule Spec is set to all '0's which will delete any existing schedules. The STA may respond with an action frame or any management or control frames containing the same PSR IE to confirm its acceptance of the new schedule. The STA may also respond with an action frame or any management or control frames with a new PSS IE if the new schedule is not acceptable in order to start a new two-way negotiation.

The embodiments disclosed above for two-way negotiation for power saving may be implemented by STAs whose transmission and reception behavior is typically event-driven, such as sensors used for fire, intruder detections, etc. This type of STAs may simply wake up during the contention-based intervals and participate in the medium access contention, (e.g., using a higher AC or priority setting), for delivery of their data.

In another embodiment, the AP may use the STA status information to assemble the partial virtual bitmap in the TIM element for the STAs in power saving mode. The STA status in power saving mode may be either listening or not-listening. The listening status means that the STA in the power saving mode awakens and listens for the next TIM/DTIM, while the not-listening status means that the STA is not available to receive any signal at its WLAN air interface. With the STA status-based TIM scheme, the partial virtual bitmap in the TIM contains the positive traffic indications for the STAs in the listening status at the time when the frame containing the TIM element is transmitted. A positive traffic indication means the corresponding bitmap bit is set to 1 indicating buffered data for the corresponding STA.

STAs operating in a power saving mode periodically listens for beacon frames, as determined by the STA's listen interval and the ReceiveDTIMs parameters. These parameters are provided in the MLME-ASSOCIATE/REASSOCIATE primitives and in the MLME-POWERMGT primitives and they are also communicated between the AP and STAs through association/re-association management frames. Therefore, when a STA enters a power saving mode, both the AP and the STA have the knowledge of the STA's listening or not-listening status at any point in time. The STA status-based TIM scheme uses such knowledge to improve the TIM efficiency, without introducing any overhead and complexity.

In accordance with another embodiment, group-based PSMP operation may be performed. For applications like energy meters where there are a large number of STAs and each STA needs to periodically transmit data of more or less the same length in the uplink or receive data of more or less the same length, each STA requires channel resources for about the same durations periodically. A PSMP operation may be extended to group-based PSMP operation by pre-defining groups of STAs and their schedule within each group. A PSMP group ID (instead of AID) may be used in the PSMP frame to address STAs (with unicast uplink and/or downlink data) belonging to the same group.

If a STA wants to be part of a PSMP group, the STA may send a PSMP request frame. The PSMP request frame may include periodicity and payload of the data to be transmitted in the UL.

The AP may configure a PSMP group by sending a PSMP group configuration frame (a broadcast or unicast management frame). The PSMP group configuration frame may include information such as a DL transmission order during a PSMP frame for a specific group, a UL transmission order during a PSMP frame for a specific group, time duration for each STA's uplink and downlink transmission if different STAs are assigned different durations, and the like. In order to save control signaling overhead, the AP may allocate identical duration for each STA in the uplink and downlink. The AP may group STAs that need similar resources.

The order of transmissions may be indicated by the sequence of association ID (AID) or partial AID of an individual STA in the group. The PSMP uplink transmission time (UTT) may be separated by either short inter-frame space (SIFS) or aIUStime. It may be even shorter because the frames for sub-1 GHz band are much longer than that in 802.11n or 802.11ac. The duration between sleep intervals need to be long enough to turn on and off the device components.

On receiving the PSMP group configuration management frame, the STA determines if it is in a specific PSMP group, computes its own UTT and downlink transmission time (DTT) in the PSMP group, and obtains its transmission/reception order in the PSMP group sequence. If the STA is part of the announced PSMP group, the STA may wait for its PSMP DTT slot according to the predefined DTT order within the group, and receives the data. The STA may then go to a sleep mode. For uplink transmission, the STA may wait for its PSMP UTT and transmit the scheduled uplink data without performing clear channel assessment (CCA) and disregarding any network allocation vector (NAV) setting.

If the STA wants to change its length of transmitted or received data, the STA may send a PSMP request control frame including differential or absolute payload of data to be transmitted or received. If the STA wants to change its periodicity of transmitted or received data, the STA may send a PSMP request control frame including differential or absolute periodicity of data to be transmitted or received.

The high peak-to-average-power ratio (PAPR) is a well known problem in an orthogonal frequency division multiplex (OFDM) system due to the Gaussian nature of the transmitted signals. A high PAPR leads to transmitter power inefficiencies since the power amplifier has to apply a back-off in order to accommodate the excursions of the transmitted signal.

The DC carrier (i.e., zero frequency tone) in the conventional 802.11 OFDM specification is not used for data transmission. This is to facilitate the implementation of direct-conversion receivers that have a known problem with DC-offset generation. Hence, any data transmitted on the DC carrier would have a higher error rate compared to that on other subcarriers.

Figure 14:
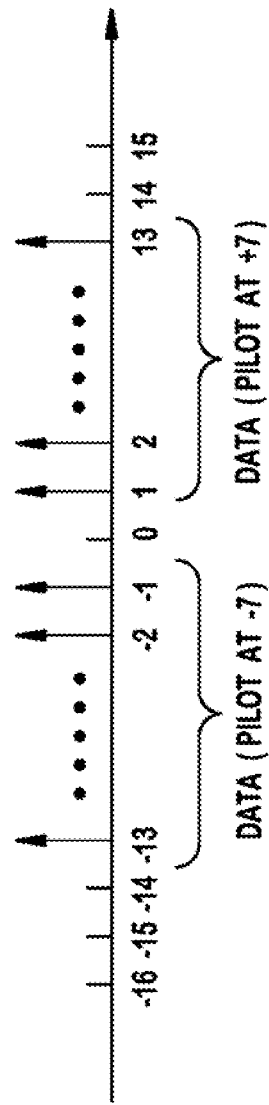
FIG. 14 shows tone allocations for 1 MHz mode of 802.11ah.

In one embodiment, a small amount of energy may be transmitted on the DC carrier in such a way that the overall PAPR of the transmitted OFDM symbol is reduced. For the 1 MHz mode of 802.11ah, the FFT size is 32, of which 24 are data, 2 are pilots, 1 is the DC, and the remaining 5 are band-edge tones. FIG. 14 shows tone allocations for 1 MHz mode of 802.11ah. For example, a value of either +1 or −1 may be inserted at the DC carrier. In order to determine this value (either +1 or −1), for each OFDM symbol, a 4-times oversampled IFFT may be performed on the data plus pilot symbols, for example as allocated to tones in FIG. 14. Let this symbol be denoted as $S_n$. Since this is oversampled, the length of $S_n$ is 128 (in case of FFT size of 32).

The PAPR is then calculated for DC=+1 and DC=−1 as follows:

$$PAPR(DC = \pm 1) = 10\log\left(\frac{\max_n(|s_n \pm 1|^2)}{\sum_{n=0}^{127} |s_n \pm 1|^2}\right).$$  Equation (1)

The value of DC carrier that minimizes the PAPR may be selected by the AP.

In another embodiment, the pilot values may be chosen to minimize the PAPR of the transmitted OFDM symbol. The pilot bits (e.g., 2 pilot bits per OFDM symbol in 802.11ah) are used by the receiver for phase offset correction. The pilot bits are normally known and fixed values, either +1 or −1. In this embodiment, instead of fixing the pilot values, a specific pilot values may be chosen to minimize the PAPR of the transmitted OFDM symbol in a similar way as described above for the DC carrier. For example, for 802.11ah with 2 pilot bits per OFDM symbol at tone locations (−7,7), there would be 4 possible pilot combinations (+1,+1), (+1,−1), (−1,+1), and (−1, −1). The PAPR of the OFDM symbol would be computed for each of these 4 combinations and the one that minimizes the PAPR may be selected for transmission. There would be no increase in the transmitted power.

The receiver needs to recover the transmitted pilot values in order to perform phase correction. Since the channel estimates are available prior to the first OFDM data (or SIG) symbol, the receiver may perform a symbol detection on each of the pilot values using the estimated channel coefficient for the pilot tone. This is essentially binary phase shift keying (BPSK) detection since the pilots are constrained to be either +1 or −1. Once the pilot values are detected, phase correction proceeds using the detected pilot values. Alternatively, the receiver may jointly estimate the pilot values and phase offset, assuming that the maximum phase offset is in the range $$\left(-\frac{\pi}{2}, \frac{\pi}{2}\right).$$

Figure 15:
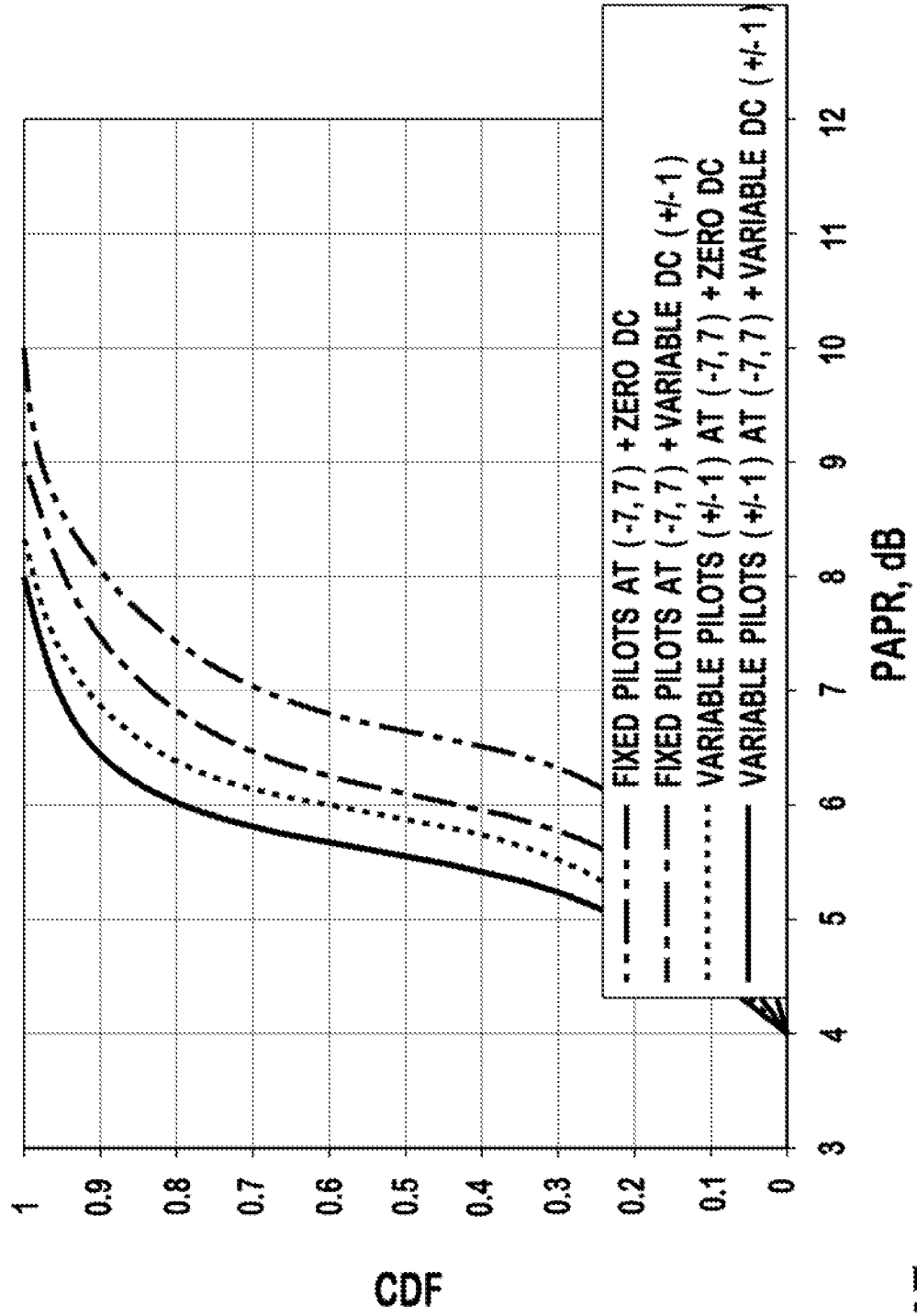
FIG. 15 shows the PAPR reduction with the embodiments for 802.11ah with 64 quadrature amplitude modulation (QAM)

The two embodiments described above may be combined to provide even greater reduction in PAPR. FIG. 15 shows the PAPR reduction with the embodiments for 802.11ah with 64 quadrature amplitude modulation (QAM).

The PAPR of an OFDM signal may be reduced by varying the interleaver (bit and/or symbol) and choosing the interleaver which results in an OFDM signal with the lowest PAPR. Given K interleavers, $\log_2(K)$ additional bits per OFDM symbol are needed to signal to the receiver which interleaver was used. This leads to reduced throughput. In one embodiment, the pilot values may be used to signal this information, with no additional overhead. For example, in a 32 point FFT system with 24 data tones, 2 pilots and 1 DC, one of four interleavers may be selected to minimize the PAPR at the transmitter for each OFDM symbol and one of the pilot values (−1,−1), (−1,1), (1,−1) and (1,1) may be used to signal this information to the receiver.

The receiver needs to recover the transmitted pilot values to perform phase correction and determine which de-interleaver to use. Since the channel estimates are available prior to the first OFDM data (or SIG) symbol, the receiver may perform a symbol detection on each of the pilot values using the estimated channel coefficient for the pilot tone. This is essentially BPSK detection since the pilots are constrained to be either +1 or −1. Once the pilot values are detected, phase correction proceeds. Alternatively, the receiver may jointly estimate the pilot values and phase offset, assuming that the maximum phase offset is in the range $$\left(-\frac{\pi}{2}, \frac{\pi}{2}\right).$$

The pilot values indicate which of the 4 pre-assigned interleavers were used at the transmitter, thus allowing the STA to pick the correct de-interleaver for the symbol.

Figure 16:
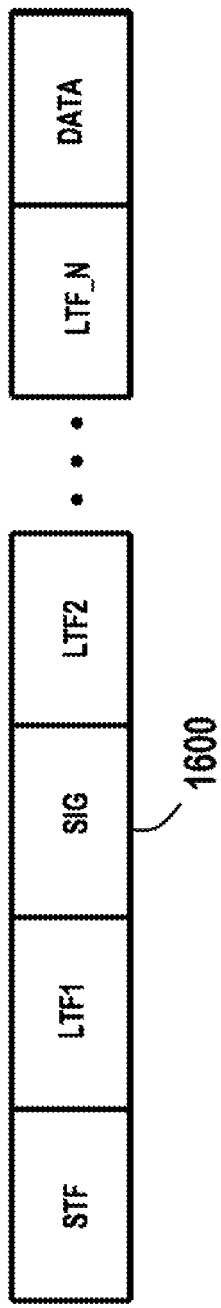
FIG. 16 shows an example format of a physical layer packet for 802.11ah 1 MHz mode of operation.
Figure 17:
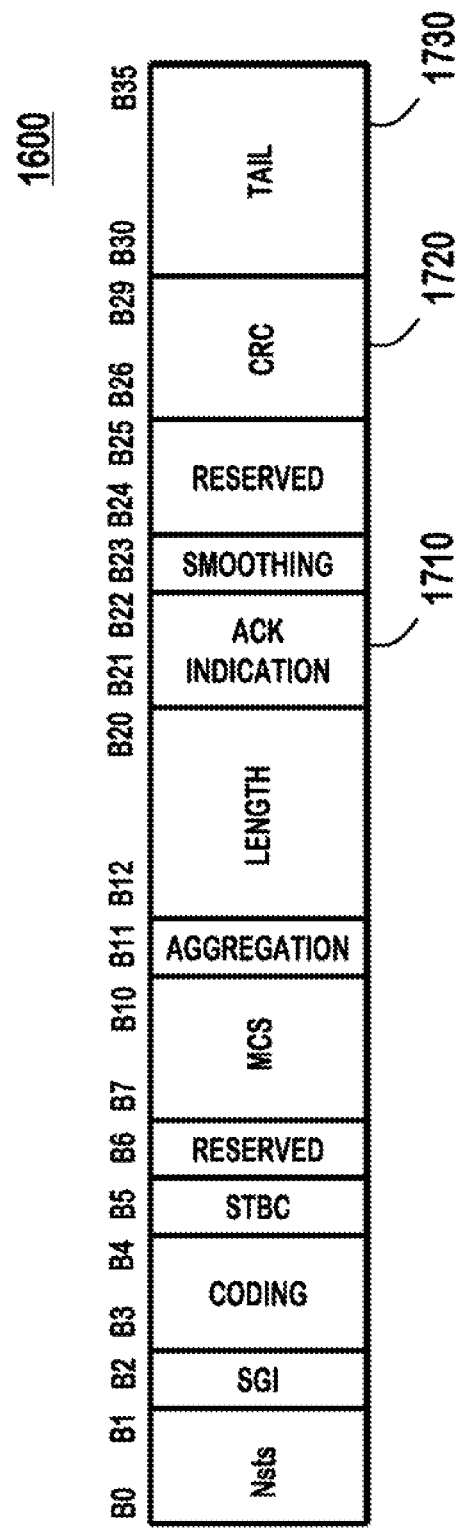
FIG. 17 shows an example format of an SIG field in the packet in FIG. 16.

Embodiments for physical layer-based power saving mechanisms are described hereafter. FIG. 16 shows an example format of a physical layer packet for 802.11ah 1 MHz mode of operation. FIG. 17 shows an example format of an SIG field 1600 in the packet of FIG. 16. A STA receives, and decodes, the SIG field 1600, and may go into a sleep state based on certain information, for example, included in the SIG field 1600 without decoding the remainder of the packet in order to save power.

In one embodiment, a direction indication bit may be included in the packet to indicate whether the packet is received from, or destined to, the AR For example, one bit or more than one bit among the currently reserved bits in the SIG field 1600 of a packet for a 1 MHz mode of 802.11ah operation may be used as the indication bit.

When a STA receives a packet, the STA decodes the SIG field 1600 of the physical layer convergence protocol (PLCP) header and checks for the direction indication bit(s) in the decoded SIG field. If the direction indication bit(s) indicates the packet is destined to the AP, the STA may go into a sleep mode without decoding the entire packet until the end of the packet duration indicated in the length field. If the direction indication bit(s) indicates that the packet was transmitted from the AP, the STA may listen to the packet and decode the packet.

If a MAC duration indication bit(s), which will be explained below, is not present in the packet and if the STA wants to transmit a packet or is expecting a packet from the AP, the STA may come out of a sleep mode after the length duration. The STA may initiate a procedure to compete for channel access at the end of the packet after a predetermined period of time (e.g., DIFS). The direction indication bit(s) may be used for indication of packet destination to or from more than one STA and/or AP.

In another embodiment, one or more bits, (e.g., called a MAC duration indication bit(s)), may be defined in the SIG field 1600. The MAC duration indication bit(s) may be used as an NAV setting indicator to indicate whether the MAC header contains any NAV setting. The MAC duration indication bit(s) may be used instead of acknowledgement (ACK) indication bits 1710, which may achieve saving of 1 bit in the SIG field 1600.

The ACK indication bits 1710 in the SIG field may be extended to indicate NAV setting or MAC medium reservation duration. In the 802.11ah SIG field of a packet, 2 bits (ACK indication bits 1710) are used to indicate the type of acknowledgment expected as a response (i.e., early ACK indication) to the packet: ACK ("00" value), block ACK (BA) ("01" value), and no ACK ("10" value). The "11" value is currently reserved. Non-zero value in the Duration field in the MAC header may be indicated by using the currently reserved bit combination "11" in the ACK indication bits 1710 in the SIG field of the PLCP header.

Alternatively, the reserved bit combination "11" in the ACK indication bits 1710 may be used to indicate that there is a non-zero value contained in the Duration field in the MAC header that is not associated with a normal ACK or a block ACK (BA).

Alternatively, the reserved bit combination "11" in the ACK indication bits 1710 may be used to indicate that there is a non-zero value contained in the Duration field in the MAC header excluding cases which correspond to ACK ("00" value), BA ("01" value), and no ACK ("10" value) indications.

The ACK indication field in request-to-send (RTS) frames may be set to "11" to indicate that there is a non-zero value contained in the Duration field in the MAC header. The ACK indication field in the RTS frames may be set to "00" to indicate that there may be a clear-to-send (CTS) frame transmitted following the RTS frame in response to the RTS frame. Alternatively, the ACK indication field in the RTS frames may be set to "00" value (e.g., to indicate a response frame of the same length as an ACK frame) since the response frame (i.e., the CTS frame) and the ACK frame have the same length in octets.

The ACK indication field in CTS frames may be set to "11" to indicate that there is a non-zero value contained in the Duration field in the MAC header.

The ACK indication field in ACK frames may be set to "11" to indicate that there is a non-zero value contained in the Duration field in the MAC header, for example, when the ACK frames are used in the packet exchanges to transmit fragmented MSDUs.

The ACK indication bits 1710 in any frame may be set by a STA or an AP to "00" to indicate a response frame that is of the same length as the ACK frame allowing an "unintended" receiving STA/AP to defer medium access so as to protect the response frame. The ACK indication bits 1710 in any frame may be set by a STA or an AP to "01" to indicate a response frame that is of the same length as the BA frame allowing an "unintended" receiving STA/AP to defer medium access so as to protect the response frame. The ACK indication bits 1710 in any frame may be set by a STA or an AP to "10" to indicate that there is no response frame, where the response frame may or may not be an ACK frame.

A field of two or more bits in the SIG field 1600 may be used to indicate a quantized value of the actual value contained in the Duration field in the MAC header. For example, two or more most significant bits (MSBs) of the Duration field value may be transmitted in the SIG field 1600. After receiving the SIG field 1600, the STA may set its NAV without decoding the MAC header. Ceiling quantization for the Duration field may be used so that the NAV is longer than the transmission. This can minimize the chance of a STA waking up when transmission is in progress.

When a STA receives a PLCP header, the STA decodes the SIG field and check the MAC duration indication bit(s) (or the ACK indication bits) in the decoded SIG field. If a MAC duration indication bit(s) is present and indicates that the MAC duration is zero and if the STA wants to transmit a packet or is expecting a packet from an AP, the STA may go to sleep for the PPDU length duration and come out of sleep afterwards.

If a MAC duration indication bit(s) is present and indicates that the MAC duration is non-zero, the STA may decide to decode the packet to obtain the MAC header. After decoding the MAC header, the STA may find out the value of the duration field and set the NAV accordingly. The STA may then go to sleep for the duration of the NAV and come out of sleep afterwards.

Alternatively, a MAC duration field may be included in the SIG field instead of, or in addition to, the MAC header to indicate the duration of the packet. The STA may check the MAC duration field in the SIG field and set the NAV accordingly. The STA may go to sleep for the duration of the NAV and come out of sleep afterwards.

If the STA cannot decode the MAC header, it may set its NAV to a default value in order to prevent premature attempts to access the wireless medium which may interrupt ongoing packet transmissions and receptions. The STA may go to sleep for the duration of the NAV and come out of sleep afterwards. For example this default value may be based on system parameters for the worst case scenario (e.g., the default value may be based on the longest packet duration, or longest TXOP, etc.).

If the ACK indication bits 1710 is used for this purpose and the ACK indication bits 1710 is set to '11', the STA may interpret it as an indication of a non-zero value in the Duration field of the MAC header which may, or may not, be associated with a normal ACK or a BA, and hence may decode the packet to obtain the MAC header, and set the NAV accordingly. The STA may go to sleep for the duration of the NAV and come out of sleep afterwards. Alternatively, the STA may interpret it as an indication of a non-zero value in the Duration field of the MAC header which excludes cases which correspond to ACK ("00" value), BA ("01" value) and no ACK ("10" value) indications, and hence may decode the packet to obtain the MAC header, and set the NAV accordingly. The STA may then go to sleep for the duration of the NAV and come out of sleep afterwards.

In 802.11ah, 4 bits are assigned for a CRC field 1720 for the SIG field 1600 that is computed based on the SIG field. A transmitter may compute the CRC based on the SIG field and mask (e.g., bitwise exclusive OR (XOR) operation) the CRC with an LSB or an MSB of the partial AID (PAID) of the target receiver. This STA-specific SIG field may introduce some power saving without using any additional bits. This may be implemented for 1 MHz mode as PAID is not included in the SIG field. This may be combined with MAC duration indication bit(s) described above.

When a STA receives a PLCP header, the STA decodes the SIG field 1600, and computes CRC on the SIG field. The STA performs bitwise XOR operation of the CRC and the LSB or MSB of the PAID. If the output of XOR operation is zero the STA may conclude that the packet may be targeted for itself, hence decode the rest of the packet. Otherwise, the STA may conclude that the received packet is not targeted for itself, the STA may go into a sleep state. In this case, if the MAC duration indication bit(s) is present, the STA may follow the procedure disclosed above.

A tail biting Viterbi decoder may be used to decode the SIG field 1600 if tail biting is used for encoding the SIG field 1600 at the transmitter. The convolutional encoder of the SIG field 1600 may be initialized with the last 6 bits of the SIG field 1600 at the transmitter. At the receiver, the start state of the Viterbi decoder becomes identical to the end state. This makes it possible for the receiver to decode the convolutionally encoded packet without terminating the trellis to the zero state. This frees up six tail bits 1730 in the SIG field 1600, which were previously used as tail bits. These six bits may be used to include the direction indication bit and/or the duration indication bit. Alternatively, the MAC duration field may be implicitly indicated by indicating the frame type. Along with ACK policy type, the receiver may compute the duration field by itself. Alternatively, it may include 6 bits (LSB or MSB) out of the 9 bits of the PAID. Any combinations of the above methods are also possible.

It should be noted that although the embodiments are described above with reference to IEEE 802.11 protocols, the embodiments are not restricted to the specific scenario disclosed but are applicable to any other wireless systems as well. It should also be noted that the embodiments disclosed above may be applied to any, or all, of 1 MHz, 2 MHz, or higher bandwidth modes of 802.11ah operations or other WiFi system.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. An access point (AP) comprising:
   a processor operatively coupled to a transceiver, the processor and the transceiver configured to:
   broadcast first power save information to at least one station (STA), the first power save information including wake-up schedule information for the at least one STA, and including a negotiation indication associated with the negotiability of the wake-up schedule information;
   wherein the first power save information enables the at least one STA to enter a doze state to save power and to enter an awake state to exchange frames with the AP; and
   receive, from the at least one STA, a request for second power save information, different than the first power save information, based on the negotiation indication.

2. The AP of claim 1, wherein the request for second power save information is received when the STA determines to reject the first power save information.

3. The AP of claim 1, wherein the processor is configured to send the first power save information in an association response frame.

4. The AP of claim 1, wherein the wake-up schedule information indicates an awake state duration-.

5. The AP of claim 1, wherein the first power save information comprises an indication of a duration that the first power save information is valid.

6. The AP of claim 1, wherein the processor is configured to broadcast the first power save information in a beacon frame.

7. A method performed by an access point (AP) the method comprising:
   broadcasting first power save information to at least one station (STA), the first power save information including wake-up schedule information for the at least one STA, and including a negotiation indication associated with eh negotiability of the wake-up schedule information;
   wherein the first power save information enables the at least one STA to enter a doze state to save power and to enter an awake state to exchange frames with the AP; and
   receiving, from the at least one STA, a request for second power save information, different than the first power save information, based on the negotiation indication.

8. The method of claim 7, wherein request for second power save information is received when the STA determines to reject the first power save information.

9. The method of claim 7, wherein the method comprises sending the first power save information in an association response frame.

10. The method of claim 7, wherein the first power save information indicates an awake state duration.

11. The method of claim 7, wherein the first power save information comprises an indication of a duration that the first power save information is valid.

12. The method of claim 7, wherein the method comprises broadcasting the first power save information in a beacon frame.

13. A station (STA) comprising:
at least one processor and a transceiver operably coupled to the at least one processor, the at least one processor and the transceiver configured to:
receive, from an access point (AP), broadcast first power save information including wake-up schedule information for the STA, and including a negotiation indication associated with the negotiability of the wake-up schedule information;
wherein the first power save information enables the STA to enter a doze state to save power and to enter an awake state to exchange frames with the AP; and
transmit, to the AP, a request for second power save information, different than the first power save information, based on the negotiation indication.

14. The STA of claim 13, wherein the at least one processor and the transceiver are configured to transmit the request for second power save information when the STA determines to reject the first power save information.

15. The STA of claim 13, wherein the at least one processor is and the transceiver are configured to receive the first power save information in a beacon frame.

16. The STA of claim 13, wherein the wake-up schedule information indicates an awake state duration.

17. The STA of claim 13, wherein the first power save information comprises an indication of a duration that the first power save information is valid.

* * * * *